Nov. 16, 1943.  E. WILDHABER  2,334,366
METHOD OF PRODUCING FACE CLUTCHES
Filed Oct. 10, 1942  2 Sheets-Sheet 1

Inventor
ERNEST WILDHABER
By
Attorney

Nov. 16, 1943.  E. WILDHABER  2,334,366
METHOD OF PRODUCING FACE CLUTCHES
Filed Oct. 10, 1942  2 Sheets—Sheet 2

Inventor
ERNEST WILDHABER
By
Attorney

Patented Nov. 16, 1943

2,334,366

UNITED STATES PATENT OFFICE 2,334,366

METHOD OF PRODUCING FACE CLUTCHES

Ernest Wildhaber, Brighton, N. Y., assignor to Gleason Works, Rochester, N. Y., a corporation of New York Application October 10, 1942, Serial No. 461,589

10 Claims. (Cl. 90—9.4)

The present invention relates to the production of toothed face clutches and particularly to the cutting with face-mill cutters of toothed face clutch members that have radially arranged teeth whose sides are longitudinally curved.

A primary object of the present invention is to provide an improved and faster process for cutting with face mill cutters toothed face clutches of the character described.

A further object of the invention is to provide a process for cutting toothed face clutches with face mill cutters in which all or substantially all of the cutting will be done with one side and the tip cutting edges of the blades and the other sides of the blades will do little or no cutting whatsoever.

To these ends, it is a further purpose of the invention to provide a process for cutting toothed face clutches by which opposite sides of spaced teeth of a clutch member may be cut simultaneously with a face mill cutter having all outside or all inside cutting blades.

Other objects of the invention will be apparent hereinafter from the specification and from the recital of the appended claims.

In cutting the tooth surfaces of a face clutch member by the process of the present invention, a face mill cutter is preferably employed which is of large enough diameter and which is so positioned as to operate simultaneously on two spaced tooth zones of the blank and cut simultaneously opposite sides of two spaced teeth of the blank. Both sides of each tooth of a clutch member will then be cut to have the same lengthwise tooth curvature, either longitudinally convex or longitudinally concave. The cutter is rotated in engagement with the clutch blank while the blank is held stationary and while a relative depthwise feed movement is effected between the cutter and blank in a direction inclined to both the cutter and blank axes until the opposite sides of two spaced teeth of the blank have been cut to full depth. Then the cutter is withdrawn from engagement with the blank, and the blank indexed. Then the cutter is fed back into the blank to cut the next pair of tooth surfaces, and thus the operation proceeds until all of the teeth of the blank have been cut.

Because the depthwise feed is in a direction inclined to the cutter axis, the tooth surfaces of the blank may be cut entirely by the tip and one side of the blades of the cutter. The other sides of the cutter blades need not do any cutting. As a result, a cutter may be employed in the process of the present invention which has all inside or all outside cutting blades. One member of a clutch pair may be cut with a cutter which has all outside cutting blades and have both sides of its teeth longitudinally concave, and the other member of the clutch pair may be cut with a cutter having all inside blades and have both sides of its teeth longitudinally convex, or both members may be cut with cutters having all inside blades, so that both members have all longitudinally convex tooth surfaces.

By using cutters with all inside or all outside blades, the number of finish side-cutting edges which may be provided in a cutter of a given diameter for finish cutting the sides of the teeth of a clutch member of the character described may be doubled as compared with the number of finish side-cutting edges provided in the conventional type of cutter heretofore employed for cutting such clutch members. Such conventional cutters have had to have alternate inside and outside cutting blades because heretofore the cutters were fed axially into the work to cut the tooth surfaces to the desired depth. The cutters had to have both inside and outside blades in order to remove stock from a solid blank, even though the actual finished sides of the clutch teeth would be finished by the sides of blades at one side of the cutter only.

By the method of the present invention, then, production is speeded up. Moreover, the sharpening of cutters is made more convenient since all of the blades can be sharpened alike and in one setup. Some saving, too, in cutter cost can be achieved since all of the blades of a given cutter can be made alike.

Figure 1:
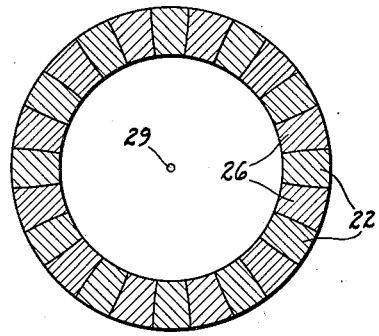
Fig. 1 is a sectional view of a pair of engaging toothed clutch members made according to one embodiment of this invention, the section being taken in a mean plane, hereinafter referred to as the pitch plane, which is perpendicular to the clutch axis.
Figure 2:
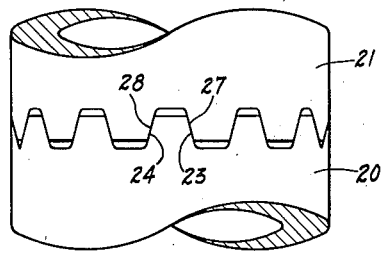
Fig. 2 is a fragmentary elevational view of the engaging clutch members.
Figure 3:
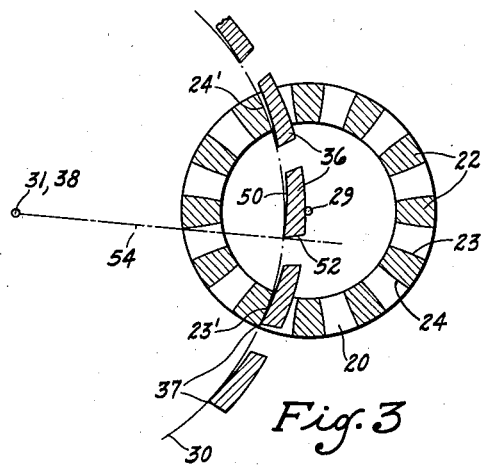
Fig. 3 is a somewhat diagrammatic view taken in the pitch plane of one of the clutch members, the plane 3—3 of Fig. 4, and illustrating one method of cutting a clutch member having side tooth surfaces of positive pressure angle according to the present invention.
Figure 5:
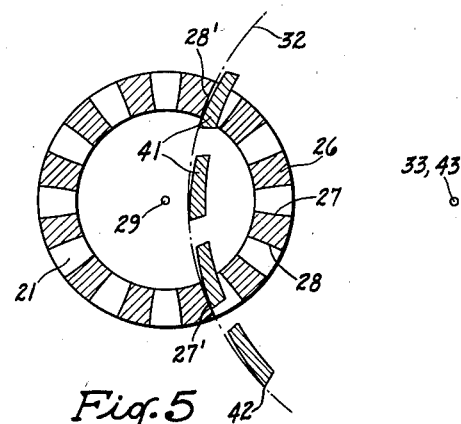
Figure 4:
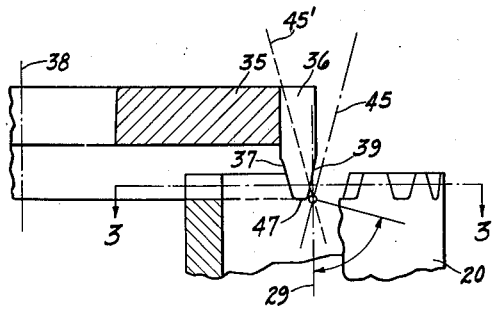
Fig. 4 is a part elevational, part sectional view further illustrating the method of cutting this clutch member.
Figure 6:
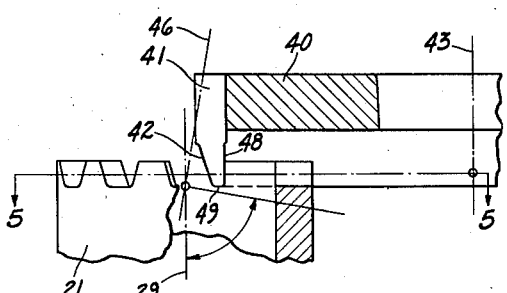
Figure 7:
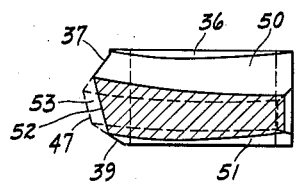
Figure 9:
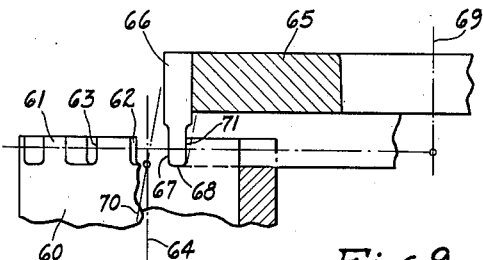
Figure 8:
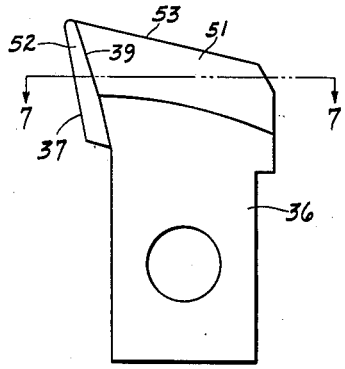
Figure 10:
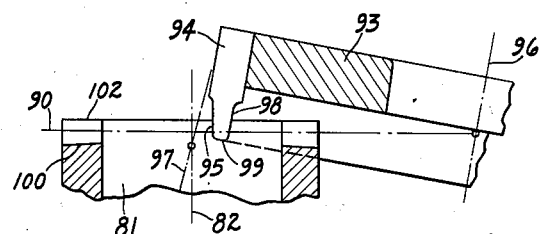
Figure 11:
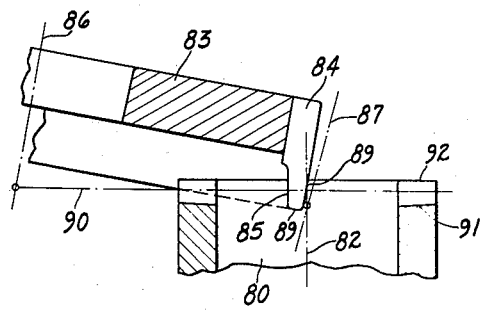

Figs. 5 and 6 are views similar to Figs. 3 and 4, respectively, and illustrating the process of cutting the mating clutch member according to this invention, Fig. 5 being a section on the line 5—5 of Fig. 6;

Fig. 7 is a transverse sectional view and Fig. 8 a side elevational view, showing one of the blades of the cutter illustrated in Figs. 3 and 4, Fig. 7 being a section on the line 7—7 of Fig. 8 but showing in dash lines also a plan view of the cutter blade;

Fig. 9 is a part elevational, part sectional view illustrating the cutting of a clutch member of zero pressure angle according to a further embodiment of this invention; and Figs. 10 and 11 are sectional views, illustrating the method of cutting mating zero pressure angle clutch members, respectively, according to a still further modification of the invention.

In Figs. 1 and 2, 20 and 21 denote, respectively, two engaging clutch members which may be cut by the process of the present invention. The member 20 has teeth 22 whose opposite sides 23 and 24 are of longitudinally convex shape. The member 21 has teeth 26 whose opposite sides 27 and 28 are longitudinally concave. The sides of the teeth of both members are of positive pressure angle, as clearly shown in Fig. 2, that is, the profiles of the teeth of both clutch members are positively inclined to the clutch axis 29. In the instance shown, opposite sides of spaced teeth of each clutch member lie in the same conical surface. Thus, the opposite tooth sides 23' and 24', for instance, of the clutch member 20 (Fig. 3) lie in a common conical surface 30 whose axis is at 31 parallel to the axis 29 of the clutch member. Likewise, the opposite tooth sides of the clutch member 21, as for instance, the sides 27' and 28', (Fig. 5), lie in a common conical surface 32 whose axis is at 33 parallel to the axis 29 of the clutch member.

Because of its construction, opposite sides of spaced teeth of the clutch member 20, as for instance the sides 23' and 24', can be cut simultaneously by a face mill cutter 35 whose blades 36 have inside cutting edges 37 of straight profile that will describe the desired convex conical tooth surfaces when the cutter is rotated on its axis. The inside cutting edges 37 of the blades 36 of the cutter must then in any plane perpendicular to the axis 38 of the cutter lie at the same radial distance from the axis 38 of the cutter as the radius of the conical surface 30 in that plane. The cutter must then also be so positioned that its axis coincides with the axis 31 of conical surface 30. Likewise, opposite sides of spaced teeth, such as the two sides 27' and 28' of the clutch member 21, can be cut simultaneously by a face mill cutter 40 whose blades 41 have outside cutting edges 42 of straight profile and positive pressure angle that will describe the conical surface 32 when the cutter is rotated on its axis. The cutter 40 must also be so positioned that its axis 43 coincides with the axis 33.

In the cutting of the tooth sides of the clutch member 20, the cutter 35 is rotated on its axis 38 while a relative depthwise feed movement is effected between the cutter and clutch in a straight line direction 45 (Fig. 4) which is inclined both to the axis 38 of the cutter and the axis 29 of the work. The blank remains stationary on its axis during this feed movement and when a pair of tooth surfaces have been cut to full depth, the cutter is withdrawn from engagement with the blank, and the blank indexed. Then the feed movement begins anew.

Similarly, in the cutting of tooth surfaces of the clutch member 21, the cutter 40 is rotated on its axis 43 while a relative depthwise feed movement is effected between the cutter and work piece in a straight line direction 46 which is inclined both to the axis 43 of the cutter and the axis 29 of the work piece. Again, the work-piece is held stationary during cutting and again, when a pair of tooth surfaces have been cut to full depth, the cutter is withdrawn from engagement with the work piece and the work is indexed.

In the case shown, the outside edges 39 of the cutter 35 are of positive pressure angle. By proper choice of the direction 45 of depthwise feed, however, as by inclining the direction 45 of feed to the axis 38 of the cutter at an angle equal to or greater than the pressure angle of the outside edges 39 of the blades, cutting with the outside edges of the blades can be completely avoided. As the cutter 35 is fed into depth, then, even though it be cutting from the solid, its blades 36 will cut with their top cutting edges 47 and their inside cutting edges 37 only, and the outside edges 39 of the blade will not do any cutting.

In a similar manner, by suitably selecting the direction 46 of depthwise feed in the cutting of the clutch member 21, cutting with the inside edges 48 of the blades 41 of the cutter 40 can be avoided. In the cutter 40 shown, the inside edges of the blades are of zero pressure angle, that is, parallel to the axis 43 of the cutter. Hence, when the cutter is fed relatively into the blank along a line 46 inclined positively to the axis 43 of the cutter, the inside edges 48 of the blade will do no cutting or rubbing, and the whole of the cutting of the tooth spaces even from the solid will be done by the top cutting edges 49 and the outside cutting edges 42 of the blades.

Because the outside edges of the blades of the cutter 35 need do no cutting, it is unnecessary to provide cutting edges on both the outside and inside surfaces of these blades, but all of the blades of this cutter may be sharpened to have inside cutting edges only. Likewise, since cutting is avoided on the inside edges of the blades of the cutter 40 in the cutting of the clutch member 21, it is unnecessary to provide keen cutting edges on the inside of the blades of this cutter, and all of the blades of this cutter may be sharpened to have outside cutting edges only. Thus, the cutter for cutting the clutch member 20 may be provided with all inside cutting edges, and the cutter for cutting the clutch member 21 may be provided with all outside cutting edges. This is in contrast with the conventional type of face mill cutters required heretofore for cutting clutch members such as the clutch members 20 and 21. The conventional type of cutters have had to be provided with both inside and outside cutting edges because the feed motion was in the direction of the axis of the cutter.

To secure most efficient cutting, the blades of cutters used in the method of the present invention are preferably sharpened to have both side and front rake. A typical blade of the cutter 35, which cuts the convex sides of the teeth of the clutch member 20, is shown in Figs. 7 and 8. This is an inside cutting blade. The cutting portion of the blade has an inside surface 50, an outside surface 51, a front face 52, and a top land 53. The front face 52 of the blade is inclined at an acute angle to the inside surface 50 of the blade and the front face 52 of the blade is also inclined rearwardly from the tip 53 of the blade to the body portion thereof, to provide the inside cutting edge 37. The side 50 and the tip surface 53 of the blade are relieved behind the front face 52 of the blade to provide cutting clearance. As shown in Fig. 3, the side rake causes the front face 52 of the blade to be inclined rearwardly with reference to a line 54 drawn radially of the cutter axis. The front rake causes the topmost portion of the cutting edge 37 to come into operation first.

The outside surfaces 51 of the blades 36 are relieved, even though the outside edges 39 do no cutting. This relief is provided in order that the cutting portions of the blades may retain their shape after sharpening. The non-cutting inside edges 48 of the blades 41 of the cutter 40, however, are of zero pressure angle and, therefore, need no relief. The inside surfaces of these blades may be ground simply as a cylindrical surface concentric with the cutter axis 43. The outside and tip surfaces of the blades 41 are, however, relieved for cutting clearance.

Fig. 9 illustrates one method of cutting according to the present invention a clutch member 60 whose teeth 61 have side surfaces 62 and 63 of zero pressure angle, that is, a clutch member whose tooth sides have profiles parallel to the axis 64 of the clutch member. In the instance shown it is assumed that the clutch member 60 has longitudinally concave side tooth surfaces. Here a face mill cutter 65 may be employed whose blades 66 have outside finish-cutting edges 67 that are of zero pressure angle, that is, parallel to the axis 69 of the cutter. The cutter is positioned with its axis 69 parallel to the axis 64 of the clutch member and is rotated on its axis in engagement with the work while being simultaneously fed in a straight line direction 70 inclined to both the axis of the cutter and the axis of the work, to cut the tooth surfaces of the work to full depth. Then, as before, the cutter is withdrawn from engagement with the work and the work is indexed. Due to the inclined feed, the cutting of the tooth surfaces of the work is done with the top-cutting edges 68 and outside cutting edges 67 of the blades, while the inside edges 71 of the blades will do no cutting. Thus, as before, the cutter may be provided with blades which cut all on the same side of the tooth slot.

Figs. 10 and 11 show the cutting of a pair of mating zero pressure angle clutch members according to a further modification of the invention. The two clutch members are denoted at 80 and 81, respectively, and their axis is designated at 82. The clutch member 80, whose teeth have longitudinally convex side surfaces which are of zero pressure angle, is cut with a face mill cutter 83 whose blades 84 have inside finish cutting edges 85 of positive pressure angle. This cutter 83 is tilted outwardly with reference to the work piece so that its axis 86 is inclined to the axis 82 of the clutch member and so that the surface constituted by the inside cutting edges 85 of the cutter at mean points in the length of the tooth surfaces being cut will be parallel to the axis 82 of the clutch member. The tooth surfaces are cut, as before, by feeding the rotating cutter in a direction 87 which is inclined both to the axis 86 of the cutter and the axis 82 of the work but at a different angle to the cutter axis than to the work axis. The feed direction is such as to relieve the outside edges 89 of the cutting blades of any cutting and cause cutting to be done entirely by the inside cutting edges 85 and tip cutting edges 89, thus making it possible to employ a cutter which has all inside cutting blades.

The mating clutch member 81 is cut with a face mill cutter 93 whose blades 94 have outside cutting edges 95 of positive pressure angle, that is, positively inclined to the axis 96 of the cutter. For cutting the tooth surfaces of the clutch member 81, the cutter 93 is tilted inwardly with reference to the work piece so that the surface constituted by the outside cutting edges 95 of the cutter is parallel to the axis 82 of the work piece at mean points in the length of the tooth surfaces to be cut. A relative depthwise feed movement is then effected between the rotating cutter and the work in a direction 97 which is inclined both to the axis 96 of the cutter and the axis 82 of the work but at different angle to the cutter axis than to the work axis. The direction of feed is so selected that the cutting of the tooth spaces of the work is done wholly by the outside cutting edges 95 and top cutting edges 99 of the cutter and cutting with the inside edges 98 is completely avoided. Thus the cutter 93 can be provided with all outside cutting blades.

Due to the inclination of the axis 86 of the cutter to the pitch line 90 of the work in the cutting of the clutch member 80, the root surfaces 91 of the teeth of this clutch member will be inclined to the pitch surface 90, and since the cutter 83 is tilted outwardly, the tooth spaces of the clutch member will be cut deeper at their inner ends than at their outer ends if the clutch member has a plane top surface 92, as shown. Likewise, due to the inward tilt of the cutter 93, the root lines 100 of the tooth spaces of the clutch member 81 will be inclined to the pitch line 90 of the clutch member and the tooth spaces of this clutch member will be deeper at their outer than at their inner ends if the top surface 102 of the clutch member is a plane surface perpendicular to the clutch axis 82. If a cutter 93 is tilted inwardly with reference to the clutch blank 81, however, at the same angle as the cutter 83 is tilted outwardly with reference to the clutch blank 80, then the teeth and tooth spaces of the two clutch members will be complementary to one another.

If it is desired to have full lengthwise contact between the tooth surfaces of mating clutch members cut according to the present invention, the outside cutting surface of the face mill cutter employed to cut one clutch member will be made of the same diameter as the inside cutting surface of the cutter employed to cut the other clutch member. Localization of lengthwise tooth bearing can be obtained by making the cutter which cuts the longitudinally convex tooth surfaces of one clutch member smaller in diameter than the cutter which cuts the longitudinally concave tooth surfaces of the other clutch member, or both clutch members may be cut with longitudinally convex tooth surfaces.

In all of the above described embodiments of the invention, the direction of feed is so selected that all of the cutting is done by one side and the tips of the blades. In each case the direction of feed is inclined to the cutter axis at an angle equal to or greater than the pressure angle of the non-cutting sides of the blades. In another embodiment of the invention, however, cutters having alternate inside and outside blades are employed according to prior conventional practice, but a depthwise feed movement in a direction inclined to clutch and cutter axes is again employed as in the previously described embodiments of the present invention. The inclined feed is here provided for the purpose of saving the finishing edges at one side of the cutter by throwing the main burden of cutting during feed to the opposite side edges and tip edges of the cutter. This embodiment of the invention is used especially for cutting clutches of heavy tooth pitch. The feed is in a direction oppositely inclined to the cutter axis from that used in the previously described embodiments of the invention; for instance, in Fig. 4 it would be along dotted line 45'. It should be noted that the feed motion, as in any embodiment of the invention, may be imparted either to the cutter or to the work.

In all of the above described embodiments of the invention, the cutter is provided with straight side-cutting edges. The invention is not restricted, however, to use with such cutters but may be applied as well where cutters having cutting edges of curved profile are used, as, for instance, spherical cutters.

In general it may be said that while several different embodiments of the invention have been described, it will be understood that the invention is capable of further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of cutting side surfaces of the teeth of a toothed face clutch member which comprises imparting an arcuate movement to a cutting tool to move the tool in a longitudinally curved path across the face of a work-piece while effecting a relative depthwise feed movement between the tool and work in a direction inclined both to the axis of the work and to the axis about which the arcuate movement of the tool takes place.

2. The method of cutting side surfaces of the teeth of a toothed face clutch member which comprises positioning a face mill cutter in engagement with a work piece so that it may cut simultaneously opposite sides of two spaced teeth of the work-piece, and rotating said cutter on its axis while effecting a relative depthwise feed movement between the cutter and work-piece in a direction inclined to the axes of both the cutter and the work to cut the tooth surfaces to full depth.

3. The method of cutting side surfaces of the teeth of a toothed face clutch member which comprises employing a face mill cutter that has all of its blades sharpended to cut at the same side, positioning said cutter in engagement with a work-piece so that it may cut simultaneously opposite sides of two spaced teeth of the work-piece, and rotating the cutter on its axis while effecting a relative depthwise feed movement between the cutter and work-piece in a direction inclined to the axes of both the cutter and work to cut the tooth surfaces of the work to full depth.

4. The method of cutting side surfaces of the teeth of a toothed face clutch member which comprises employing a face mill cutter that has all of its blades sharpened to cut at the same side, positioning said cutter in engagement with a work-piece with its axis parallel to the axis of the work-piece so that it may cut simultaneously opposite sides of two spaced teeth of the work-piece, and rotating said cutter on its axis while effecting a relative depthwise feed movement between the cutter and work-piece in a direction inclined to the axes of both the cutter and work-piece to cut the tooth surfaces of the work-piece to full depth.

5. The method of cutting side surfaces of the teeth of a toothed face clutch member which comprises employing a face mill cutter that has side-cutting edges of positive pressure angle and all lying at the same side of the cutter, positioning the cutter in engagement with the work-piece so that its axis is parallel to the axis of the work-piece and so that it may cut simultaneously opposite sides of two spaced teeth of the work-piece, and rotating the cutter on its axis while effecting a relative depthwise feed movement between the cutter and work-piece in a direction inclined to the axes of both the cutter and the work-piece so as to cut the tooth surfaces to full depth with said side-cutting edges and the top cutting edges of the cutter only.

6. The method of cutting side surfaces of the teeth of a toothed face clutch member which comprises employing a face mill cutter that has side-cutting edges of zero pressure angle and all lying at the same side of the cutter, positioning said cutter in engagement with a work-piece so that its axis is parallel to the axis of the work-piece and so that it may cut simultaneously opposite sides of two spaced teeth of the work-piece, and rotating said cutter on its axis while effecting a relative depthwise feed movement between the cutter and work-piece in a direction inclined to the axes of both the cutter and work-piece so as to cut the tooth surfaces to full depth with said side-cutting edges and the top-cutting edges only.

7. The method of cutting side surfaces of the teeth of a toothed face clutch member which compises employing a face mill cutter that has side-cutting edges of positive pressure angle all lying at the same side of the cutter, positioning said cutter in engagement with a work-piece so that it may cut simultaneously opposite sides of two spaced teeth of the work-piece and so that its axis is inclined to the axis of the work-piece to cut tooth surfaces of zero pressure angle on the work, and rotating said cutter on its axis while effecting a relative depthwise feed movement between the cutter and work in a direction inclined to the axes of both the cutter and work to cut the tooth surfaces to full depth with said side-cutting edges and the top cutting edges of the cutter only.

8. The method of cutting a pair of toothed face clutch members which comprises cutting one member with a face mill cutter that has all inside finish cutting edges of positive pressure angle and cutting the other member with a face mill cutter that has all outside finish cutting edges of positive pressure angle, by positioning each cutter relative to the work-piece to be cut thereby so that the cutter will operate simultaneously on opposite sides of two spaced teeth of the work-piece and the finish side-cutting edges of the cutter will be inclined to the work axis at an angle to cut tooth surfaces of zero pressure angle on the work, and rotating said cutter on its axis while effecting a relative depthwise feed movement between the cutter and work in a direction inclined to the axes of both the cutter and the work but differently inclined to each.

9. The method of cutting teeth in face clutches which comprises positioning a face-mill cutter and a work-piece in engagement with the axes of cutter and work-piece in the same plane, and rotating the cutter on its axis while effecting a relative depthwise feed motion between cutter and work-piece in a direction inclined to the axes of both, and periodically withdrawing the cutter from engagement with the work-piece, and indexing the work-piece.

10. The method of cutting side surfaces of the teeth of a toothed face clutch member which comprises positioning a face-mill cutter, that has inside and outside cutting edges, in engagement with a work-piece with the axes of cutter and work-piece in the same plane, and rotating the cutter on its axis while effecting a relative depthwise feed motion between cutter and work-piece in a direction inclined to the axes of both so as to cut more with the side-cutting edges at one side of the cutter than with the side-cutting edges at the opposite side of the cutter.

ERNEST WILDHABER.